(12) United States Patent
Voelcker et al.

(10) Patent No.: US 9,141,442 B1
(45) Date of Patent: Sep. 22, 2015

(54) AUTOMATED CONNECTOR CREATION FOR PROVISIONING SYSTEMS

(75) Inventors: Eckhard Voelcker, Berlin (DE); Sylko Zschiedrich, Ullersdorf (DE)

(73) Assignee: Dell Software Inc., Aliso Viejo, CA (US)

( * ) Notice: Subject to any disclaimer, the term of this patent is extended or adjusted under 35 U.S.C. 154(b) by 293 days.

(21) Appl. No.: 13/228,351

(22) Filed: Sep. 8, 2011

Related U.S. Application Data

(60) Provisional application No. 61/380,948, filed on Sep. 8, 2010.

(51) Int. Cl.
*G06F 9/54* (2006.01)

(52) U.S. Cl.
CPC .................................. *G06F 9/541* (2013.01)

(58) Field of Classification Search
None
See application file for complete search history.

(56) References Cited

U.S. PATENT DOCUMENTS

| | | | |
|---|---|---|---|
| 6,871,232 B2 | 3/2005 | Curie et al. | |
| 6,947,989 B2 | 9/2005 | Gullotta et al. | |
| 6,985,955 B2 | 1/2006 | Gullotta et al. | |
| 2002/0133535 A1* | 9/2002 | Lucovsky et al. | 709/201 |
| 2003/0229812 A1* | 12/2003 | Buchholz | 713/202 |
| 2005/0022023 A1* | 1/2005 | Chincheck et al. | 713/201 |
| 2006/0080352 A1* | 4/2006 | Boubez et al. | 707/102 |
| 2006/0150202 A1* | 7/2006 | Bendapudi et al. | 719/328 |
| 2007/0245013 A1* | 10/2007 | Saraswathy et al. | 709/223 |
| 2008/0208806 A1* | 8/2008 | Dalfo et al. | 707/3 |

OTHER PUBLICATIONS

Beaver et al., Provisioning for Dummies, Quest Software Edition, Wiley Publishing, Inc., 32 pages (2011).
Creating an XML Web Service Proxy, MSDN, http://msdn.microsoft.com/en-us/library/d2s8y7bs(d=printer,v=vs.80).aspx, 4 pages (2011).
Revoor, Java Web Service Tools, http://freshmeat.net/articles/jave-web-services-tools, 4 pages (2011).

* cited by examiner

*Primary Examiner* — Shih-Wei Kraft
(74) *Attorney, Agent, or Firm* — Winstead PC

(57) ABSTRACT

Systems and methods for automating or at least partially automating the creation of connectors for a provisioning system are described. A provisioning system can include a connector creation module that analyzes an application programming interface (API) of a target system. Based on this analysis, the provisioning system can automatically create a connector module that can communicate with the target system. The connector creator may also provide a user interface that enables users to customize the functionality of the connector module. For example, a user can specify which routines of the target system API will be called by the connector module, which user identity parameters of the target system will be updated, and so forth. The connector creation module can automatically generate code for the connector module that implements the user-specified functionality. The finished connector module can be executed to provision the target system.

14 Claims, 11 Drawing Sheets

Integrate new web service

Web service properties
Define the connection and the service properties here. Then click "Check.." to validate the settings.

| | |
|---|---|
| Web service name | ServiceNowUser |
| Description | Manages ServiceNow user accounts |
| .NET namespace for the proxy co... | ServiceNowUser |
| Web service URL | https://demo.service-now.com/sys_user.do?SOAP |
| WSDL files URL | https://demo.service-now.com/sys_user.do?wsdl |
| User account name | admin |
| User domain | |
| User password | ***** |
| Password confirmation | ***** |
| | ☐ Locked |
| wsdl.exe location | C:\WSDL\wsdl.exe |
| Extended | ˅ |

410
420
430
440

Check...

Back   Next   Cancel

AUTOMATED CONNECTOR CREATION FOR PROVISIONING SYSTEMS

RELATED APPLICATIONS

This application claims the benefit of priority under 35 U.S.C. §119(e) of U.S. Provisional Patent Application No. 61/380,948, filed on Sep. 8, 2010, entitled "Automated Connector Creation for Provisioning Systems," the disclosure of which is hereby incorporated by reference in its entirety.

BACKGROUND

Provisioning a user identity for an organization's computing environment can include creating a user's identity and assigning rules, roles, or permissions to that identity. This process can involve creating a directory account and providing the account with the correct permissions to ensure that the user has appropriate access to the resources and applications he or she needs for day-to-day tasks. For example, in the Windows® world, provisioning often includes creating an account in Active Directory® (AD), a mailbox account in Microsoft® Exchange™, and assignment to the various distribution lists and groups required by the user's role in the organization.

Organizations tend to provision many different target systems. Some examples of target systems include human resources (HR) management systems, ERP (enterprise resource planning) systems, any number of Web portals and applications, various directories that control access to different types of resources such as servers and databases, phone systems, and so on. Although some steps, such as provisioning the phone system, might be unavoidably separate, others represent a frustrating redundancy because a single user's identity may need to be provisioned multiple times on multiple target systems with multiple processes to create the right access. If a company has already settled on AD as its authoritative directory, it can be frustratingly inefficient to also be required to provision user accounts across all the systems and applications that do not leverage the AD identity for access. Moreover, the provisioning process can continue as user's roles and authorizations change or as users leave the organization.

Every provisioning action consumes time, creates another point that may have to be audited for compliance requirements, and is another opportunity for human error. The result is significant time and money spent correcting provisioning errors—assuming the errors are even discovered.

SUMMARY

In certain embodiments, a method of provisioning a plurality of target systems with identity information includes (by a computer system having computer hardware) establishing communication with first and second target systems, where each of the first and second target systems can utilize user identity information to manage user accounts of a plurality of users, programmatically accessing a first application programming interface (API) of the first target system to identify first routines for managing first user identities in the first target system and first parameters associated with the first user identities in the first target system, and programmatically accessing a second application programming interface (API) of the second target system to identify second routines for managing second user identities in the second target system and second parameters associated with the second user identities in the second target system. The method can also include electronically generating a parameter mapping user interface having functionality for a user to graphically map one or more of the first and second parameters of the first and second target systems to one or more provisioning parameters of the provisioning system and automatically generating a first connector module having one or more first provisioning routines. The one or more first provisioning routines can access one or more of the first routines of the target system to set the one or more first parameters of the target system to one or more values of the one or more provisioning parameters. Further, the method can include automatically generating a second connector module having one or more second provisioning routines. The one or more second provisioning routines can access one or more of the second routines of the target system to set the one or more second parameters of the target system to one or more values of the one or more provisioning parameters. Moreover, the method can include executing the first and second connector module to thereby provision the first and second target systems with the user identity information of the plurality of users.

Various embodiments of a system for provisioning a target system with identity information can include a connector creation module having computer hardware. The connector creation module can at least: establish communication with a target system that can utilize user identity information to manage user accounts of a plurality of users. The connector creation module can also programmatically access an application programming interface (API) of the target system to identify routines for managing user identities in the target system and parameters associated with the user identities in the target system. Further, the connector creation module can electronically generate a parameter mapping user interface having functionality for a user to graphically map one or more of the parameters of the target system to one or more provisioning parameters of the provisioning system. The connector creation module may also automatically generate a connector module having one or more provisioning routines, where the one or more provisioning routines can access one or more of the routines of the target system to set the one or more parameters of the target system to one or more values of the one or more provisioning parameters. Moreover, the connector creation module can execute the connector module to thereby provision the target system with the user identity information of the plurality of users.

Furthermore, in some embodiments, non-transitory physical computer storage is provided having instructions stored thereon for implementing, in one or more processors, operations for provisioning a target system with identity information. The operations can include establishing communication with a target system that can utilize user identity information to manage user accounts of a plurality of users, programmatically accessing an application programming interface (API) of the target system to identify routines for managing user identities in the target system and parameters associated with the user identities in the target system, electronically generating a parameter mapping user interface having functionality for a user to graphically map one or more of the parameters of the target system to one or more provisioning parameters of the provisioning system, and automatically generating a connector module having one or more provisioning routines. The one or more provisioning routines can access one or more of the routines of the target system to set the one or more parameters of the target system to one or more values of the one or more provisioning parameters. Moreover, the operations can include executing the connector module to thereby provision the target system with the user identity information of the plurality of users.

The systems and methods described herein can be implemented by a computer system comprising computer hardware. The computer system may include one or more physical computing devices, which may be geographically dispersed or co-located.

Certain aspects, advantages and novel features of the inventions are described herein. It is to be understood that not necessarily all such advantages may be achieved in accordance with any particular embodiment of the inventions disclosed herein. Thus, the inventions disclosed herein may be embodied or carried out in a manner that achieves or selects one advantage or group of advantages as taught herein without necessarily achieving other advantages as may be taught or suggested herein.

BRIEF DESCRIPTION OF THE DRAWINGS

The features of embodiments of the inventions disclosed herein are described below with reference to the drawings. Throughout the drawings, reference numbers are re-used to indicate correspondence between referenced elements. The drawings are provided to illustrate embodiments of the inventions described herein and not to limit the scope thereof.

FIGS. 4 through 11 illustrate embodiments of user interfaces for automating connector creation that can be generated by the provisioning system.

DETAILED DESCRIPTION

I. Introduction

One approach to provisioning multiple target systems is to synchronize the identities and provisioning activities across the entire range of target systems. In such cases, custom-coded connectors containing business logic, workflow, and/or rules are built to automate and control the provisioning process. The advantage of the synchronization approach is that provisioning actions are automated in precisely the way the organization had designed them. The disadvantage is that these connectors are extremely expensive to build, take years to implement (during which time the requirements may have changed), are rigid and cannot dynamically adjust to organizational evolution, and do nothing to overcome the root of the provisioning problem—too much complexity.

This disclosure describes systems and methods for automating or at least partially automating the creation of connectors for a provisioning system. In certain embodiments, a provisioning system includes a connector creation module that analyzes an application programming interface (API) of a target system. Based on this analysis, the provisioning system can automatically create a connector module that can communicate with the target system. The connector creator may also provide a user interface that enables users to customize the functionality of the connector module. For example, a user can specify which routines of the target system API will be called by the connector module, which user identity parameters of the target system will be updated, and so forth. Advantageously, in certain embodiments, the connector creation module can automatically generate code for the connector module that implements the user-specified functionality. The finished connector module can be executed to provision the target system.

II. Example Provisioning Systems

Figure 1:
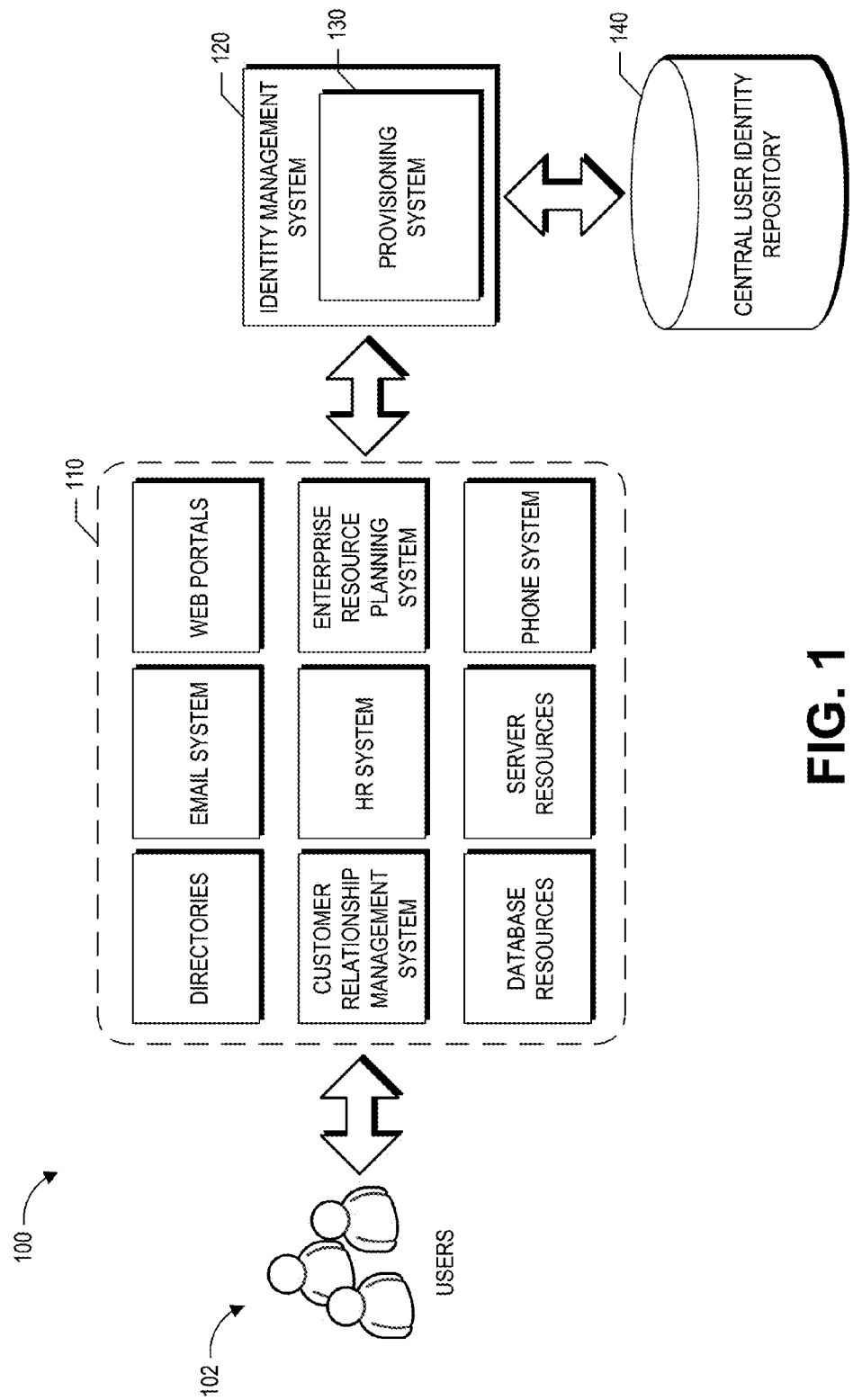
FIG. 1 illustrates an embodiment of a computing environment for providing identity management services to various example target systems.

FIG. 1 illustrates an embodiment of a computing environment 100 in which users 102 communicate with various systems 110. In any given organization, users 102 may interact with several different systems, some examples of which are shown, including directories, email systems, Web portals, customer relationship management (CRM) systems, ERP systems, HR systems, database resources, server resources, and phone systems. Each of these systems 110 may separately store user identity information for use in authenticating users 102 and authorizing user access to computing resources.

An identity management system 120 is provided for managing user identity information in the disparate systems 110. The identity management system 120 can include hardware and/or software for managing this user identity information. In some implementations, the identity management system 120 stores a single set of identity information for each user 102 in a central user identity repository 140 and makes this single set of identity information available to each of the systems 110. Users 102 can therefore have consistent access to each of the systems 110. Some identity management features that the identity management system 120 can provide include single sign-on (SSO), which allows users 102 to log in to different systems 110 with the same credentials (or log in once for multiple systems 110), managing of user roles (e.g., to authorize user access to various resources), compliance and auditing, provisioning, and optionally other features.

The provisioning aspects of the identity management system 120 are implemented by a provisioning system 130. The provisioning system 130 can provision user identity information to the systems 110, which can include inserting, updating, deleting, or otherwise managing user identity information with respect to the systems 110. For example, the provisioning system 130 can initially provide user identity information to the systems 110 when a user 102 joins an organization or otherwise needs new access to a given system 110. The provisioning system 130 can also update or modify existing user identity information in the systems 110. User identity information may be updated when user characteristics (such as roles) change when users 102 are promoted or otherwise assigned different responsibilities in an organization. For example, a newly-promoted manager may need a higher level of authorization to various resources or systems 110. User identity information can also change when users 102 work on new projects and need authorization to access a different set of systems or resources. The provisioning system 110 can also delete or disable user identity information from the systems 110 when users 102 no longer require access to them, such as when users change departments or leave the organization.

Advantageously, in certain embodiments, the provisioning system 110 can automate processes for provisioning user identity information with the various systems 110. Such functionality is described in greater detail with respect to FIG. 2, which illustrates a more detailed embodiment of a provisioning system 230 in the context of a computing environment 200.

Figure 2:
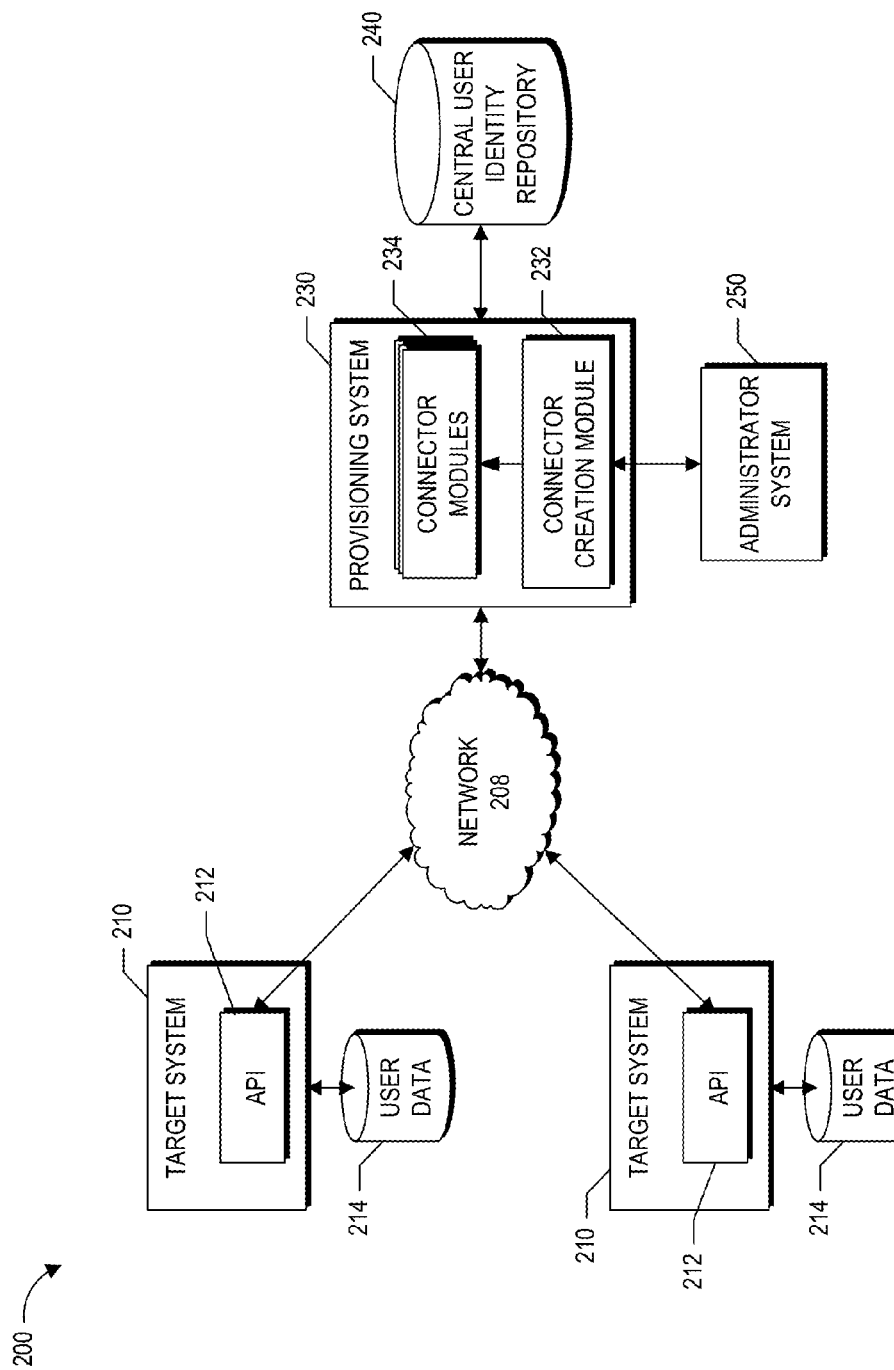
FIG. 2 illustrates an embodiment of a computing environment including a provisioning system for automatically provisioning target systems with identity information.

In the computing environment 200 of FIG. 2, the provisioning system 230 is shown in communication with target systems 210. The target systems 210 are generalized examples of the systems 110 described above with respect to FIG. 1. Two target systems 210 are shown for illustrative purposes, although the provisioning systems 230 may communicate with many more target systems in other embodiments. The provisioning system 230 is also in communication with a central user identity repository 240. The central user identity repository 240 can include physical computer storage that stores user identity information. This user identity information can include user identity objects, identity-related parameters or attributes, data structures (such as tables or rows in tables), or the like. For example, the user identity objects can include user accounts, groups, containers or memberships of users in groups, credentials, permissions or access rights, roles, entitlements, users' personal information (such as phone number, address, etc.), and the like.

The provisioning system 230 can include hardware and/or software for implementing various provisioning functions, including automatic connector creation (described in detail below). For example, the provisioning system 230 can include software that executes on one or more computing devices, such as one or more physical server computers. In implementations where the provisioning system 230 is implemented on multiple servers, these servers can be co-located or can be geographically separate (such as in separate data centers). In addition, the provisioning system 230 can be implemented in one or more virtual machines that execute on one or more physical servers.

As further illustrated, the provisioning system 230 and the target systems 210 communicate over a network 208, which can include a local area network (LAN), a wide area network (WAN), the Internet, or the like. For example, the network 208 can include an organization's private intranet or a combination of an intranet and the public Internet. Moreover, the target systems 210 are also shown in communication with user data repositories 214 that store user identity information specific to each of the target systems 210.

In the depicted embodiment, the provisioning system 230 includes a connector creation module 232 and various connector modules 234 (often referred to herein simply as "connectors"). In order to provision one of the target systems 210, the connector creation module 232 can analyze the target system 210 and automatically build a connector 234 to the target system 210 based on this analysis. This automation is facilitated in certain embodiments by the target system 210 exposing an API 212, which may be accessed by the connector creation module 232. One example of an API 212 that the target systems 210 can expose is a web service API 212. The web service API 212 can include a schema or API description in the format of an XML file, JSON (Java Standard Object Notation) file, YAML file, or the like, accessible via the network 208. For example, the XML file can be a Web Services Description Language (WSDL) file accessible via the Simple Object Access Protocol (SOAP). However, other description languages or protocols may be used to access the schema of the API 212, including Windows Communication Foundation services, remote procedure calls (RPC), RESTful interfaces (e.g., over HTTP), and the like.

The schema file of the API 212 can include a description of routines (such as methods, functions, classes, etc.), objects, and/or parameters that the target system 210 uses to insert, delete, and/or update identity objects, among other functionality. For example, the description in the schema file can include a listing of method signatures that include parameters for calling the methods. The connector creation module 232 can read the schema file to gather information about the target system's API 212. The connector creation module 232 can use this information to automatically generate source code for the new connector 234 to the target system 210.

For example, the connector creation module 232 can use the API 212 to automatically generate a first portion of connector 234 code for communicating with the target system 210. The connector creation module 232 may also provide options for users to configure the functionality of the connector 234. For instance, the connector creation module 232 can expose a user interface for an administrator of the provisioning system 230 to configure this functionality (e.g., using an administrator system 250). The user interface can include options for mapping the schema of the provisioning system 230 to the schema of the target system 210 by relating routines and/or parameters of the provisioning system 230 to routines and/or parameters of the target system 210. Once the mapping is completed, the connector creation module 232 can automatically generate a second portion of connector 234 code that reflects this mapping. The connector creation module 232 can then persist the connector 234 code to data storage (e.g., in the repository 240) and/or compile the connector 234 code. The connector 234 can be executed by the provisioning system 230 to insert, update, delete, or otherwise manage user identity information in the target systems 210, synchronizing user data amongst the target systems 210. The connector creation module 232 can therefore advantageously save development time, driving down the costs associated with provisioning.

In other embodiments, the connector creation module 232 creates the first communication portion of the connector 234 and the mapped portion at the same time, instead of in two distinct steps. More detailed connector creation embodiments are described below with respect to FIGS. 3-11.

It should be noted that the administrator system 250 can include any type of computing device capable of executing one or more applications and/or accessing network resources. In certain embodiments, the administrator system 250 includes a desktop, netbook, laptop, or tablet computer. In other embodiments, the administrator system 250 can include a smartphone, a workstation, a server, a PDA, or the like. The administrator system 250 can also include software for interacting with the connector creation module 232 and/or provisioning system 230, such as browser software or other client software.

III. Example Connector Creation Process

Figure 3:
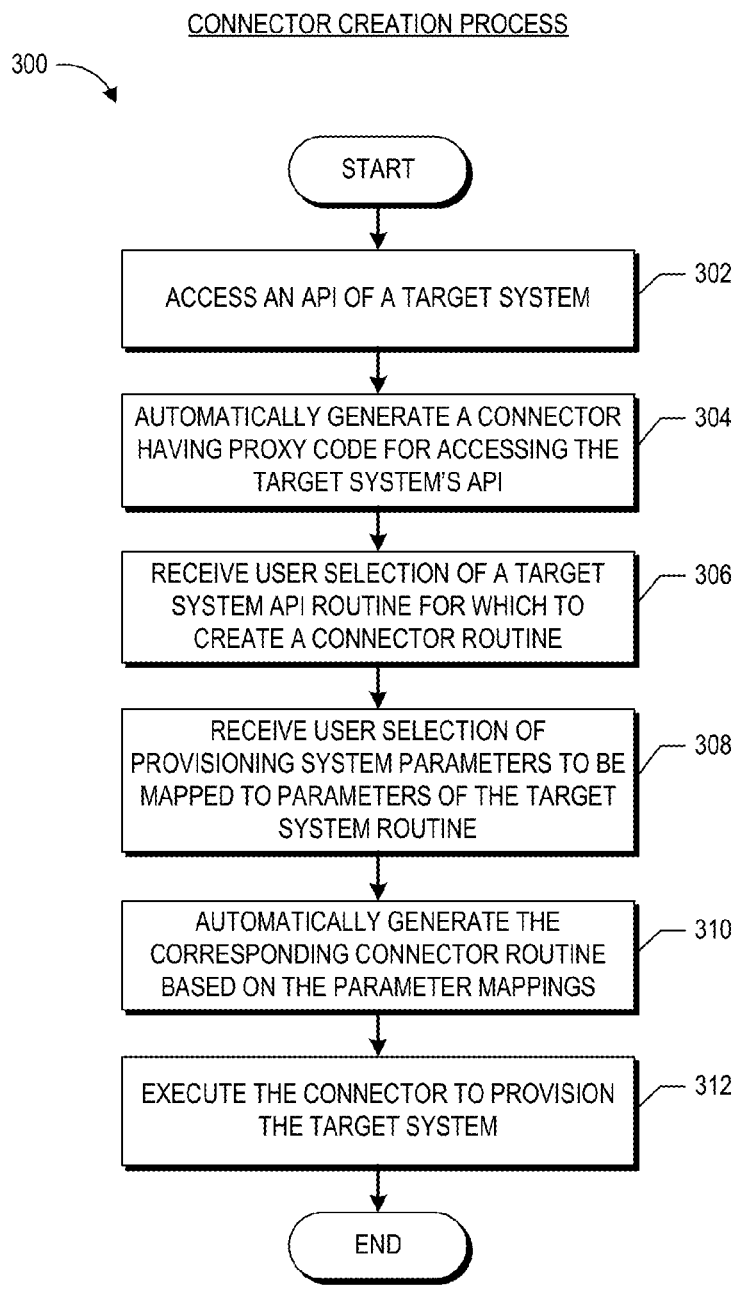
FIG. 3 illustrate an embodiment of a connector creation process that can be implemented by the provisioning system of FIG. 2.
Figure 5:
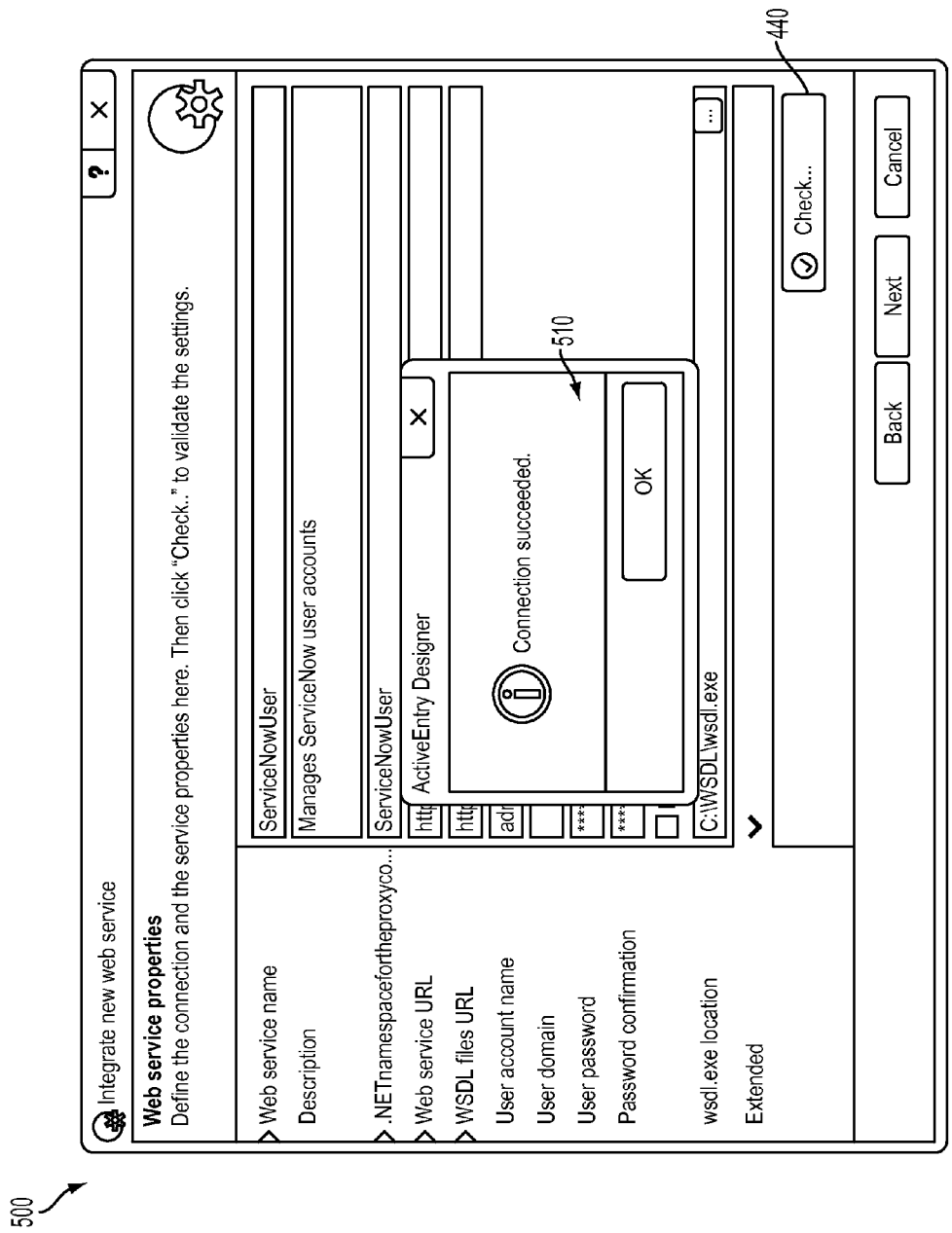

FIG. 3 illustrates an example connector creation process 300 that can be implemented by the connector creation module 232 to create a connector 234. For illustrative purposes, the process 300 will be described with reference to the components of the provisioning system 230 of FIG. 2, although the process 300 may also be implemented by the provisioning system 210 of FIG. 1 or by another system. In addition, the process 300 will be described in conjunction with the example user interfaces shown in FIGS. 4 through 11. Each of these user interfaces may be created by the connector creation module 232 (or provisioning system 130) and accessed by the administrator system 250 described above. It should be noted, however, that although the process 300 is described in the context of these user interfaces, the process 300 can also be implemented through scripting or a command-line interface or shell.

At block 302, the connector creation module 232 accesses an API 212 of a target system 210. As described above, the connector creation module 232 can access the schema of the API using a web service call or other remote communications protocol. For ease of description, the remainder of this specification will describe connector creation in the context of web services. However, it should be understood that these features are non-limiting examples.

The connector creation module 232 can access the API schema automatically, for example, by scanning ports or other network addresses associated with the target system 210 to obtain the schema. Alternatively, the connector creation module 232 can access the API schema in response to direction from a user, such as an administrator. For example, referring to FIG. 4, a user interface 400 is shown that enables a user to provide API connectivity information to the connector creation module 232. In the user interface 400, fields 410, 420 are provided for entering a web service network address (such as a URL—Uniform Resource Locator) and WSDL file network address (e.g., URL). These fields 410, 420 are populated in the depicted embodiment with network addresses for a "Service Now™" system. Service Now™ is an IT helpdesk system used as an example target system 210 herein.

Also included are fields for entering credentials 430 for accessing the target system 210 and a connection check button 440. User selection of the connection check button 440 causes the connector creation module 232 to establish or attempt to establish a connection with the web service of the target system 210. An indication of a successful connection can be output to a user, as shown in a user interface 500 of FIG. 5 (output 510). The connection check button 440 is optional in certain embodiments.

Figure 6:
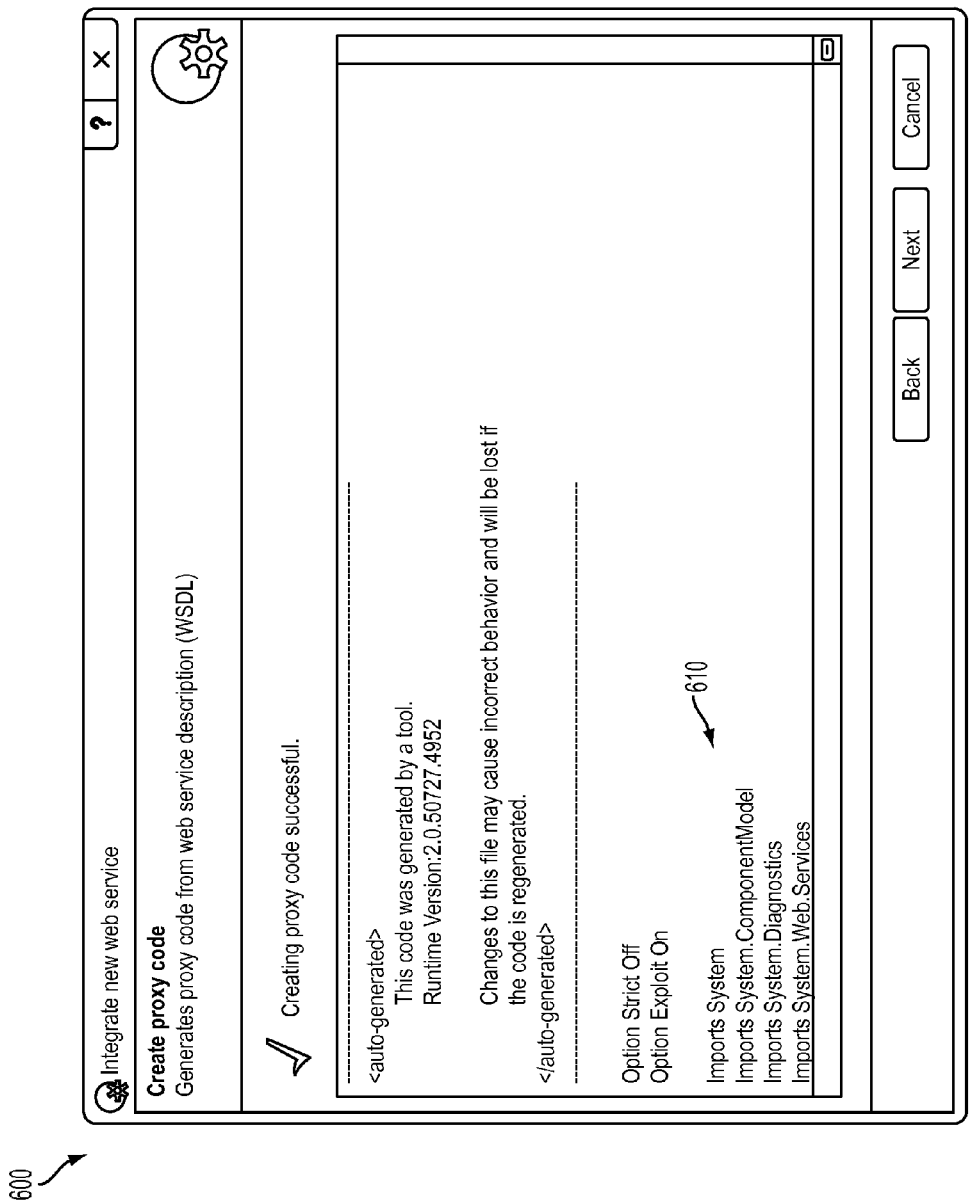

Referring again to FIG. 3, at block 304, the connector creation module 232 automatically generates a connector 234 having proxy code for accessing the target system's API 212. The proxy code can include a class or other routine(s) that facilitate communication with routines of the web service API 212. As will be described in more detail below, other routines of the connector 234 can invoke the routines of the proxy code to communicate with the web service API 212 over the network 208. An example user interface 600 in FIG. 6 depicts a confirmation of creation of the proxy code, along with a depiction of a portion of the proxy code 610. In one embodiment, the proxy code is generated automatically by invoking the WSDL.exe program provided by Microsoft®.

Figure 7:
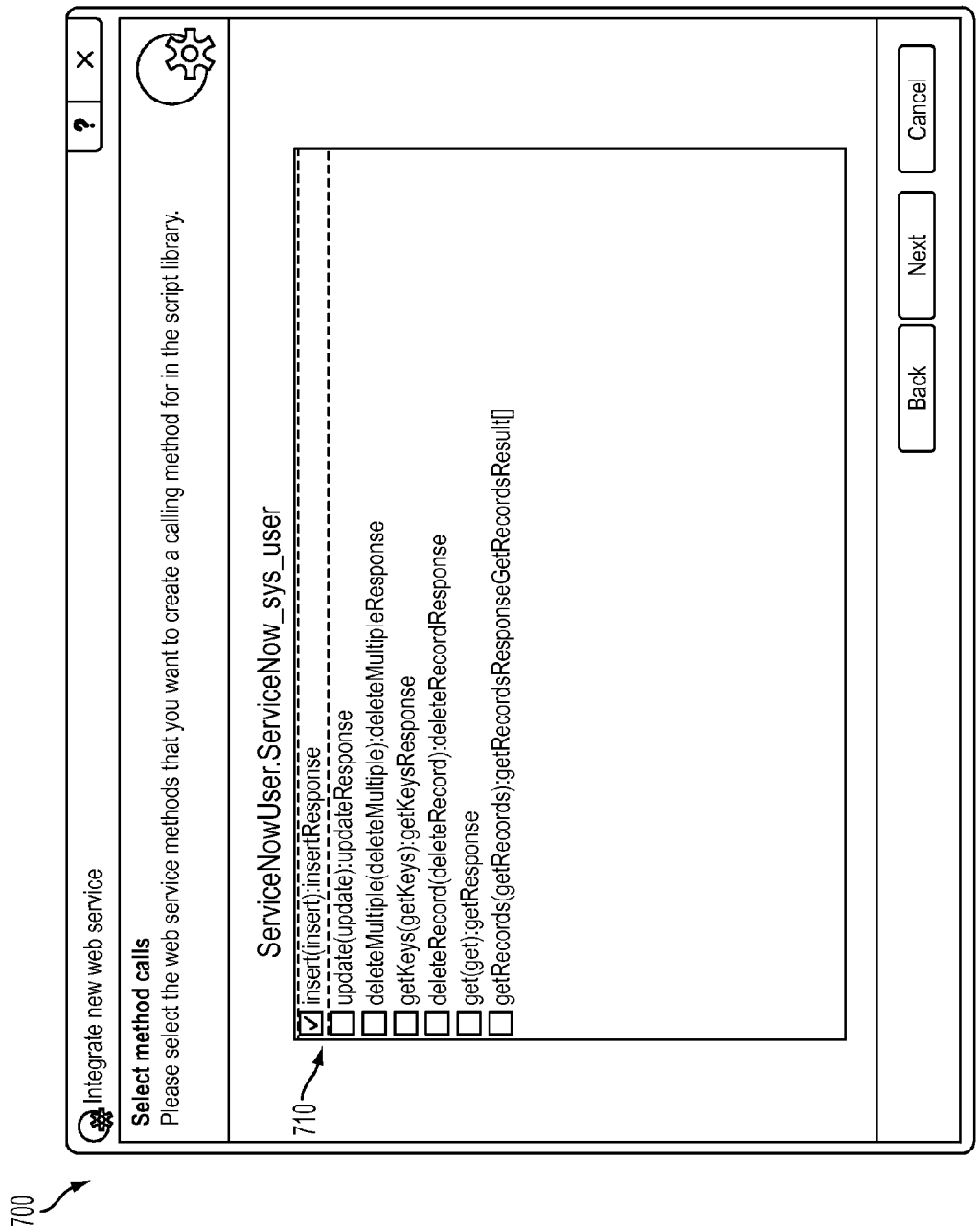

In block 306 of FIG. 3, the connector creation module 232 receives a user selection of a target system API 212 routine for which to create a corresponding connector 234 routine, script, or the like. The connector creation module 232 may, for instance, output a user interface that enables a user to choose from the available API 212 routines in the target system 210 obtained in block 302. FIG. 7 illustrates such an example user interface 700. In this user interface 700, several routines 710 are shown that were identified from the API 212 schema. These routines 710 include insert, update, and delete routines, among others, enabling creation, modification, and deletion of user identity data. A user selection of an "insert" routine is shown in the depicted embodiment.

At block 308 of FIG. 3, the connector creation module 232 receives a user selection of provisioning system parameters to be mapped to parameters of the selected target system routine. Provisioning system parameters can include parameters or attributes of a class or routine that correspond to user identity information stored in the user identity repository 140 or 240. Some examples of provisioning system parameters or attributes include user credentials, user names (e.g., first and last name), user roles, permissions, entitlements, and the other attributes described above, among others. Mapping of these parameters allows changes to the provisioning system parameters to be propagated to the target system parameters. For example, populating a given provisioning system parameter with a certain value can cause, via the mapping, a connector to set the corresponding mapped parameter in the target system with the same value. The connector creation module 232 can output a graphical mapping user interface that enables a user to map the target system and provisioning system parameters together. An example of such a user interface is shown in FIGS. 8 and 9.

Figure 8:
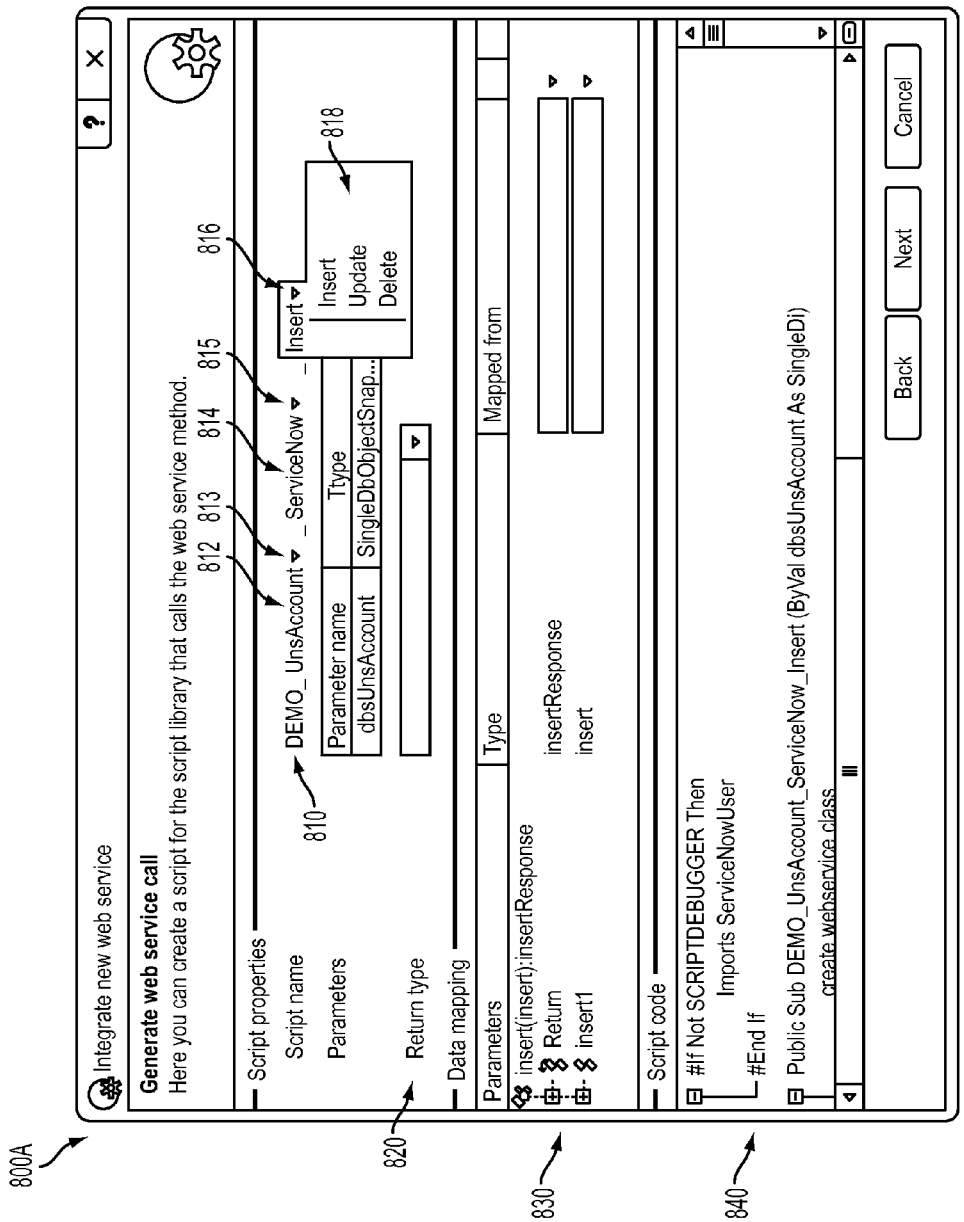
Figure 9:
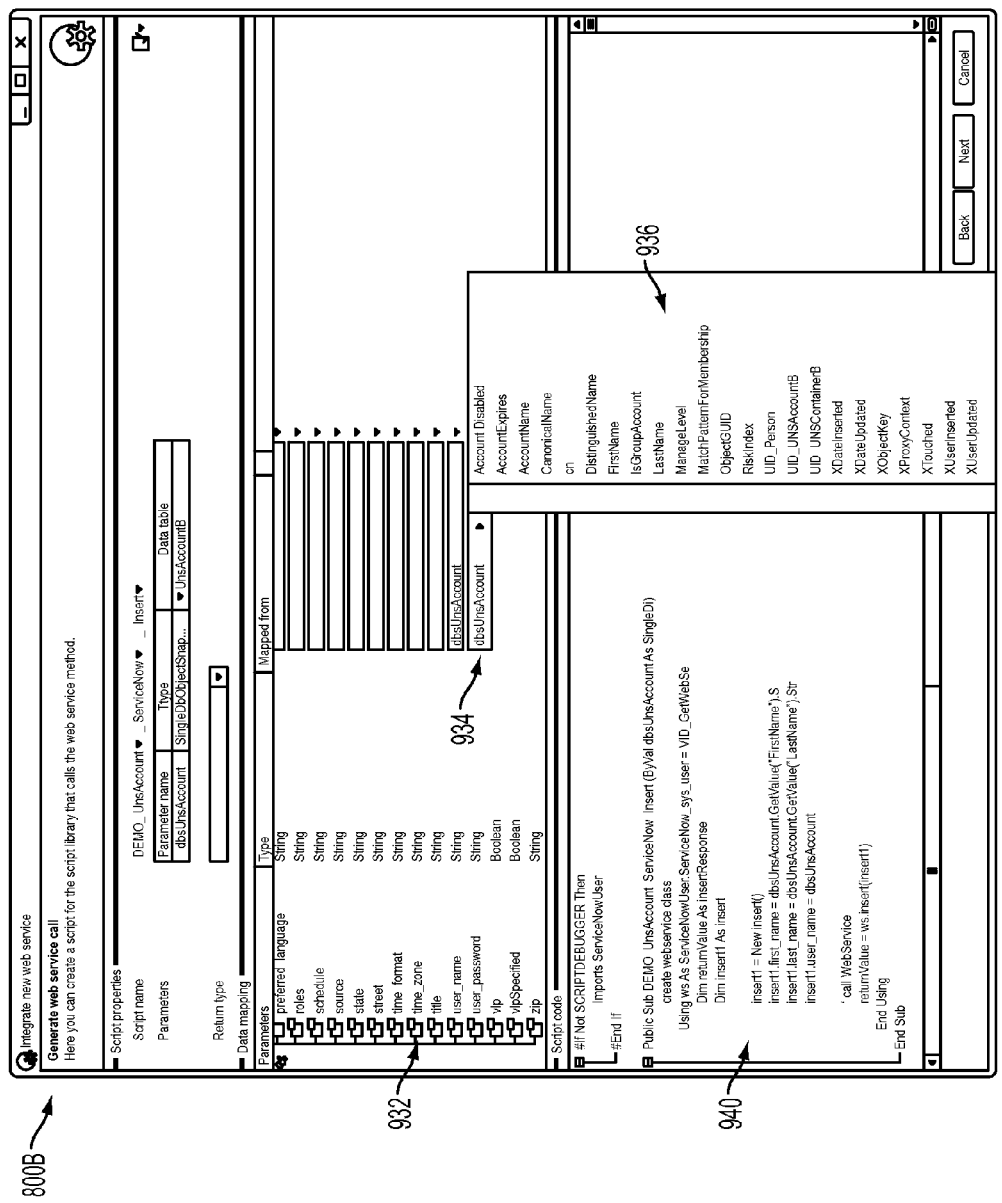
Figure 10:
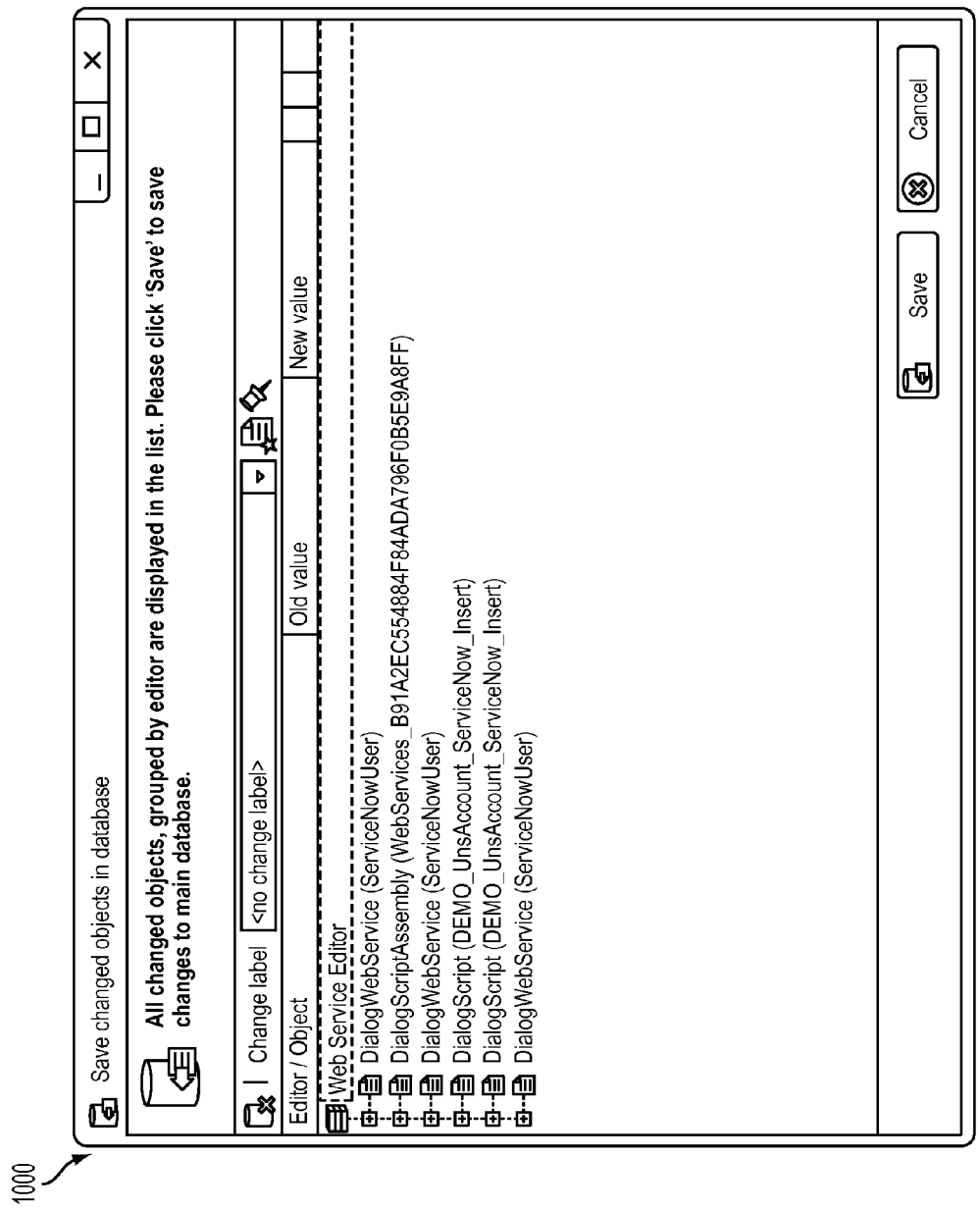
Figure 11:
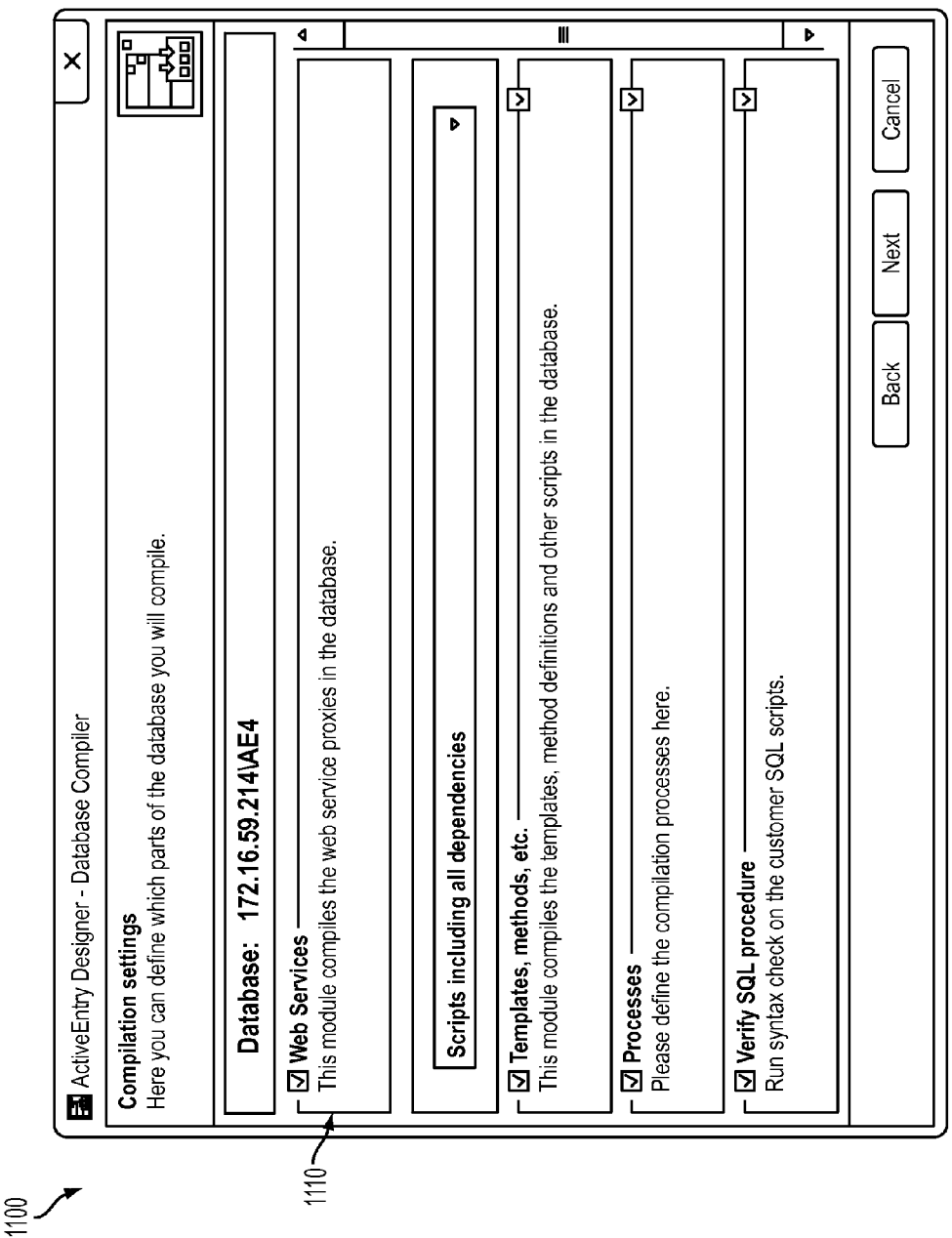

Referring to FIG. 8, a graphical mapping user interface 800A is shown. In the user interface 800A, user interface controls 810 are provided for selecting an object class and associated calling routine that can use the proxy class to call the routine of the target system API 212 selected in block 306 (see FIG. 7). The selected object class can be a class provided by the provisioning system. For instance, in this example, an object class 812 "UnsAccount" and subclass 814 "ServiceNow" of the provisioning system 130, 230 are selected. The class "UnsAccount" corresponds to general user account information. "Uns" stands for unified namespace, and this namespace may include other classes that can be selected via the drop-down arrow 813. Some examples of other classes include a group class that can affect group characteristics in the target system, a container class that can affect container characteristics in the target system, and an account-in-group class that can affect user memberships in groups.

The subclass 814 "ServiceNow" is a class that represents the example ServiceNow target system 210. A different target system class could instead be selected using a drop-down arrow 815. A routine 816 of this subclass 814 can be selected from the drop-down box 818 to create a custom routine. The selected routine 816 in this example is an insert routine 816. The routines 816 available for selection in the drop-down box 818 can depend on the class type. For some types of classes, such as account, group, or container classes, the available routines include insert, update, and delete. Other types of classes (such as the account-in-group membership class) may include add and delete routines. Other routines may also be available in different implementations. For purposes of illustration, the insert routine 816 is described in detail herein, although it should be understood that the features described with respect to the insert routine 816 can apply to other routines.

Upon user selection of the insert routine 816, the connector creation module 232 can access an insert routine template from computer storage. The insert routine template can include a portion of generic code that may be used for any insert routine 816. This generic code can include, for example, references to header files or libraries to be included, programming interfaces, debugging parameters, constructors, destructors, programming language keywords, and the like. The insert routine 816 template can then be customized via parameter mappings. Such mappings can cause the insert routine 816 to invoke a corresponding insert routine of the proxy class, which in turn invokes the corresponding routine of the target system 210 to insert or set parameters of the target system 210. A return type 820 of the insert routine 816 can also be specified.

A user can graphically map parameters 830 of the proxy class (corresponding to parameters of the target system routine) to parameters of the insert routine 816. This graphical mapping can cause the connector creation module 232 to populate the insert routine 816 template with custom code for the insert routine 816. This code is shown as connector code 840, which script code includes both template code and custom code.

Parameter mapping is shown in more detail in FIG. 9, which includes a more detailed view of the same user interface 800B as in FIG. 8. Parameters 932 of the proxy class corresponding to the target system routine are shown on the left of the user interface 800B. In the example embodiment shown, these parameters include such attributes as roles, schedule, address information (state, street, zip), user name, password, and the like. One or more of these parameters 932 can be mapped upon user selection to parameters or attributes of the class 812, 934 (UnsAccount). Selection of the UnsAccount class 934 causes the user interface 800B to output a dropdown box in the depicted embodiment, which includes parameters 936 of the class 934. For example, a user can select a "first name" parameter from the class 934 to map to the corresponding "user name" parameter of the target system routine.

Referring again to FIG. 3, at block 310, upon user selection of one or more class 934 parameters to map one or more proxy class parameters 932, the connector creation module 232 can automatically insert custom code in the insert routine template to produce the connector code 940. The connector creation module 232 can use reflection techniques to obtain the names of the proxy class parameters (and optionally return values) at runtime. With these names, the connector creation module 232 can use string combination or concatenation techniques to construct code that maps the parameters. For example, a line of code that maps the proxy class "first_name" parameter to a "FirstName" parameter of the provisioning system is shown as "insert1.first_name=dbsUnsAccount.GetValue("First-Name") . . . " etc.

In operation, the connector code 940 can create an instance of the web service proxy class, map the defined parameters, and call the selected method of the proxy class. Calling this method with the selected parameters can cause the proxy class to invoke the web service to populate the target system with the selected parameters. As shown in a user interface 1000 of FIG. 10, the connector code 940 can be saved in a database or other data store. Options 1110 for compiling the connector code 940 are provided in a user interface 1100 of FIG. 11.

Referring again to FIG. 3, the newly-created connector module 234 is executed by one or more processors to thereby provision the target system 210 at block 312. The connector module 234 can be executed in response to user request, on an automatic job schedule, or in response to request by the target system for updated identity information. The connector module 234 can be executed multiple times, for example, once for each user to insert the identity of each user in the target system 210. The connector creation module 232 may periodically access the target system 210 API 212 to determine whether any changes to the API's 212 schema have been made. If any changes have been made, the connector creation module 232 can adjust the settings of the connector module 234 accordingly.

IV. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the vehicle management system 110 or 210 can be implemented by one or more computer systems or by a computer system including one or more processors. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Moreover, conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for provisioning a target system with identity information, the system comprising:
    a connector creation module comprising computer hardware, the connector creation module configured to at least:
        establish communication with a target system configured to utilize user identity information to manage user accounts of a plurality of users;
        automatically scan a port or a network address associated with the target system to access a web service application programming interface (API) of the target system to identify routines for managing user identities in the target system and parameters associated with the user identities in the target system;
        electronically generate a parameter mapping user interface comprising functionality for a user to graphically map one or more of the parameters of the target system to one or more provisioning parameters of a provisioning system;
        automatically generate a connector module comprising one or more provisioning routines by at least generating a proxy class that corresponds to the web service API, the one or more provisioning routines configured to access one or more of the routines of the target system to set the one or more parameters of the target system to one or more values of the one or more provisioning parameters;
        execute the connector module to thereby provision the target system with the user identity information of the plurality of users; and
        automatically customize a template of a routine to include the mapping of the one or more parameters, such that said execution of the connector module is configured to cause the routine to invoke the proxy class to cause the one or more mapped parameters to be adjusted in the target system; and
    a central user identity repository configured to store the user identity information of the plurality of users.

2. The system of claim 1, wherein the one or more provisioning routines are configured to perform one or more of the following actions: insert user identity information, update user identity information, and delete user identity information.

3. The system of claim 1, wherein the connector creation module is further configured to periodically access the web service API to check for updates to the web service API.

4. The system of claim 3, wherein the connector creation module is further configured to automatically update the connector module based on the updates to the web service API.

5. Non-transitory physical computer storage comprising instructions stored thereon for implementing, in one or more processors, operations for provisioning a target system with identity information, the operations comprising:
    establishing communication with a target system configured to utilize user identity information to manage user accounts of a plurality of users;
    wherein the user identity information of the plurality of users is centrally stored;
    automatically scanning a port or a network address associated with the target system to access a web service application programming interface (API) of the target system to identify routines for managing user identities in the target system and parameters associated with the user identities in the target system;
    electronically generating a parameter mapping user interface comprising functionality for a user to graphically map one or more of the parameters of the target system to one or more provisioning parameters of a provisioning system;
    automatically generating a connector module comprising one or more provisioning routines by at least generating a proxy class that corresponds to the web service API, the one or more provisioning routines configured to access one or more of the routines of the target system to set the one or more parameters of the target system to one or more values of the one or more provisioning parameters;
    executing the connector module to thereby provision the target system with the user identity information of the plurality of users; and
    automatically customizing a template of a routine to include the mapping of the one or more parameters, such that said execution of the connector module is configured to cause the routine to invoke the proxy class to cause the one or more mapped parameters to be adjusted in the target system.

6. The non-transitory physical computer storage of claim 5, wherein the operations further comprise periodically accessing the web service API to check for updates to the web service API.

7. The non-transitory physical computer storage of claim 6, wherein operations further comprise automatically updating the connector module based on the updates to the web service API.

8. The non-transitory physical computer storage of claim 5, wherein said accessing the web service API comprises accessing a Web Services Description Language (WSDL) file.

9. The non-transitory physical computer storage of claim 8, wherein the proxy class is generated based on the WSDL file.

10. The non-transitory physical computer storage of claim 5, in combination with a computer system comprising computer hardware.

11. A method for provisioning a target system with identity information, the method comprising:

by a computer system comprising computer hardware:

establishing communication with a target system configured to utilize user identity information to manage user accounts of a plurality of users;

wherein the user identity information of the plurality of users is centrally stored;

automatically scanning a port or a network address associated with the target system to access a web service application programming interface (APD of the target system to identify routines for managing user identities in the target system and parameters associated with the user identities in the target system;

electronically generating a parameter mapping user interface comprising functionality for a user to graphically map one or more of the parameters of the target system to one or more provisioning parameters of a provisioning system;

automatically generating a connector module comprising one or more provisioning routines by at least generating a proxy class that corresponds to the web service API, the one or more provisioning routines configured to access one or more of the routines of the target system to set the one or more parameters of the target system to one or more values of the one or more provisioning parameters;

executing the connector module to thereby provision the target system with the user identity information of the plurality of users; and automatically customizing a template of a routine to include the mapping of the one or more parameters, such that said execution of the connector module is configured to cause the routine to invoke the proxy class to cause the one or more mapped parameters to be adjusted in the target system.

12. The method of claim 11, wherein the one or more provisioning routines are configured to perform one or more of the following actions: insert user identity information, update user identity information, and delete user identity information.

13. The method of claim 11, further comprising periodically accessing the web service API to check for updates to the web service API.

14. The method of claim 13, further comprising automatically updating the connector module based on the updates to the web service API.

* * * * *